United States Patent
Johansson

(10) Patent No.: US 11,791,924 B2
(45) Date of Patent: Oct. 17, 2023

(54) OPTICAL CHANNEL POWER CONTROL SYSTEM AND METHOD

(71) Applicant: Infinera Corporation, Annapolis Junction, MD (US)

(72) Inventor: Bengt Johansson, Hägersten (CH)

(73) Assignee: Infinera Corporation, San Jose, CA (US)

( * ) Notice: Subject to any disclaimer, the term of this patent is extended or adjusted under 35 U.S.C. 154(b) by 0 days.

(21) Appl. No.: 16/056,776

(22) Filed: Aug. 7, 2018

(65) Prior Publication Data

US 2019/0215091 A1 Jul. 11, 2019

Related U.S. Application Data

(60) Provisional application No. 62/615,889, filed on Jan. 10, 2018.

(51) Int. Cl.

| | |
|---|---|
| *H04J 14/02* | (2006.01) |
| *H04B 10/079* | (2013.01) |
| *H04B 10/40* | (2013.01) |
| *H04B 10/25* | (2013.01) |

(52) U.S. Cl.
CPC .... *H04J 14/0221* (2013.01); *H04B 10/07955* (2013.01); *H04B 10/2589* (2020.05); *H04B 10/40* (2013.01)

(58) Field of Classification Search
None
See application file for complete search history.

(56) References Cited

U.S. PATENT DOCUMENTS

| | | | | |
|---|---|---|---|---|
| 6,057,951 A | * | 5/2000 | Sugawara | H01S 3/1301 398/1 |
| 6,941,079 B1 | * | 9/2005 | Barozzi | H04B 10/077 359/337 |
| 7,236,700 B1 | * | 6/2007 | Liu | H04B 10/291 398/61 |
| 7,340,170 B2 | * | 3/2008 | Park | H04B 10/032 398/14 |

(Continued)

OTHER PUBLICATIONS

Ghuman, Harj; "DWDM Access for Remote PHY Networks Integrated Optical Communications Module (OCML)"; SCTE/ISBE 2017 Fall Technical Forum; Oct. 2017.

*Primary Examiner* — Li Liu
(74) *Attorney, Agent, or Firm* — David L. Soltz

(57) ABSTRACT

Systems and methods are disclosed, including a method comprising receiving power loss measurement parameters for components of an optical transmission system comprising a first node having a preamplifier, the first node configured to transmit and receive optical signals on a number of optical channels to and from one or more first transceivers; a second node configured to transmit and receive optical signals on the number of optical channels to and from one or more second transceivers; and one or more bidirectional optical fiber between the first node and the second node; determining and setting, using one or more of the power loss measurement parameters and using a number of optical channels in the optical transmission system, a power gain for the preamplifier in the first node, in order to obtain a target client power of the optical signals transmitted to the one or more first transceivers.

12 Claims, 6 Drawing Sheets

(56) References Cited

U.S. PATENT DOCUMENTS

| | | | | |
|---|---|---|---|---|
| 7,343,093 B2* | 3/2008 | Oberg | | H04B 10/032 398/3 |
| 7,587,139 B1* | 9/2009 | Bonnedal | | H04B 10/0797 398/33 |
| 7,596,317 B2* | 9/2009 | Lee | | H04J 14/02 398/67 |
| 8,116,629 B2* | 2/2012 | Boduch | | H04J 14/0204 398/82 |
| 8,873,963 B2* | 10/2014 | Handelman | | H04J 14/02 398/79 |
| 8,897,639 B2* | 11/2014 | Trojer | | H04J 14/0282 398/158 |
| 9,762,319 B1* | 9/2017 | Wang | | H04B 10/0777 |
| 2004/0022490 A1* | 2/2004 | Eu | | G02B 6/12019 385/37 |
| 2005/0041977 A1* | 2/2005 | Denkin | | H04B 10/2916 398/94 |
| 2005/0041978 A1* | 2/2005 | Roy | | G02B 6/4246 398/97 |
| 2006/0104638 A1* | 5/2006 | Chung | | H04J 14/0226 398/71 |
| 2008/0131128 A1* | 6/2008 | Ota | | H04J 14/0201 398/79 |
| 2010/0119223 A1* | 5/2010 | Ferrari | | H04B 10/0773 398/4 |
| 2011/0038632 A1* | 2/2011 | Zou | | H04B 10/27 398/72 |
| 2011/0274429 A1* | 11/2011 | Caplan | | H04B 10/5561 398/65 |
| 2014/0050471 A1* | 2/2014 | Bernasconi | | H04Q 11/0067 398/2 |
| 2016/0269127 A1* | 9/2016 | Ghuman | | H04J 14/02 |
| 2018/0212706 A1* | 7/2018 | Ghuman | | H04J 14/0282 |
| 2019/0037286 A1* | 1/2019 | Ghuman | | H04J 14/0291 |
| 2019/0149245 A1* | 5/2019 | Campos | | H04B 10/615 |

* cited by examiner

Power Tuning

Power Tuning Configuration

| | |
|---|---|
| US active ch num(1-20): | 10 |
| DS active ch num(1-20): | 10 |
| US Client target power(-1,-18): | -7.00 |

Status

| | | | |
|---|---|---|---|
| DS BA to L1 loss(dB): | 2.15 | | |
| DS Client to BA loss(dB): | 7.70 | | |
| US L1 to PA loss(dB): | 1.85 | DS BA to L2 loss(dB): | 2.05 |
| US PA to Client loss(dB): | 7.70 | US L2 to PA loss(dB): | 1.75 |
| DS LOS: | Off | | |
| Saturated: | None | US LOS: | Off |

DS tuning value

| | | | |
|---|---|---|---|
| L1 signal avg calc(dBm): | 7.35 | | |
| L1 signal total calc(dBm): | 17.35 | L2 signal avg calc(dBm): | -1.78 |
| DS BA gain set(5-20.5dB): | 17.48 | L2 signal total calc(dBm): | 8.22 |

US Tuning Value

| | | | |
|---|---|---|---|
| L1 Power avg act(dBm): | -21.83 | L2 Power avg act(dBm): | -12.70 |
| US PA gain set(19-29dB): | 24.38 | OSNR(dB): | 28.71 |
| US Client signal avg calc(dBm): | -7.00 | US Client signal avg actual (dBm): | -6.89 |
| L1 Voa(0-20dB): | 0.00 | L2 Voa(0-20dB): | 9.23 |

Conf    Apply

FIG. 5

Power Tuning

Power Tuning Configuration
- US active ch num(1-20): 10
- DS active ch num(1-20): 10
- US Client target power(-1,-18): -7.00

Status
- DS BA to L1 loss(dB): 2.15
- DS Client to BA loss(dB): 7.70
- US L1 to PA loss(dB): 1.85
- US PA to Client loss(dB): 7.70
- DS LOS: Off
- Saturated: None
- DS BA to L2 loss(dB): 2.05
- US L2 to PA loss(dB): 1.75
- US LOS: Off

DS tuning value
- L1 signal avg calc(dBm): 2.10
- L1 signal total calc(dBm): 12.10
- DS BA gain set(5-20.5dB): 16.11
- L2 signal avg calc(dBm): 1.70
- L2 signal total calc(dBm): 11.70

US Tuning Value
- L1 Power avg act(dBm): -13.10
- US PA gain set(19-29dB): 19.65
- US Client signal avg calc(dBm): -7.00
- L1 Voa(0-20dB): 4.00
- L2 Power avg act(dBm): -12.70
- OSNR(dB): 32.67
- US Client signal avg actual (dBm): -6.75
- L2 Voa(0-20dB): 4.50

[Conf] [Apply]

Monitor | EDFA Setting | Table Tuning | Power Tunning infinera

FIG. 6

OPTICAL CHANNEL POWER CONTROL SYSTEM AND METHOD

INCORPORATION BY REFERENCE

The entirety of the following patents and patent applications are hereby expressly incorporated herein by reference: provisional patent application Ser. No. 62/615,889, filed Jan. 10, 2018, entitled "Channel power control in optical systems."

FIELD OF THE DISCLOSURE

The disclosure generally relates to methods and systems that control the channel power in wave-division multiplexing optical data systems. More particularly the disclosure relates to commissioning proper channel power into receivers at two sides of a wave-division multiplexing system. The inventions disclosed work with any protocol, including, but not limited to, OTN, SDH, Ethernet, CPRI, eCPRI, Fast Ethernet, and Fibre channel.

BACKGROUND

Wave-division multiplexing (WDM) is a type of multiplexing in which two or more optical carrier signals are multiplexed onto a single optical fiber by using different wavelengths (that is, colors) of laser light.

Bandwidth is the data transfer capacity of a link or connection (also referred to as a "path"), which may be expressed in optical data units, bits per second, number of time slots, or expressed by other methods.

In many optical transmission networks, such as p2p networks, there are (1) working connections within the network having multiple nodes and communication links for transmitting data between a headend node and a tailend node; and (2) protecting connections specifying different communication links for transmitting data between the headend node to the tailend node in the event that one or more of the working connections fail. Working connections may also be referred to as working paths. Protecting connections may also be referred to as protecting paths and/or protection paths. A first node of a path may be referred to as a headend node or a source node. A last node of a path may be referred to as a tailend node or end node or destination node. Typically, the headend node initially selects to transmit and receive data over the working connection and then, when a working connection fails, the headend selects a protecting connection for passing data within the network. The set up and activation of the protecting connections may be referred to as protection. Protection mechanisms, where network resources act as backup for working connections, have been in use for some time.

In optical systems, "gain" or amplification is a measure of an increase in optical power. Additionally, "loss" is considered the part of the energy of the laser field that becomes unusable in an optical fiber of the optical system or in the optical system. The energy of the loss may be absorbed or scattered. Typically, optical transmission systems are designed to include compensation for losses in fibers, filters, and other components of the system through amplifying the power of the optical signal. This amplification has to be suitable to obtain a channel power that is within the receiver's dynamic range, that is, not too high and not too low.

The line fibers, filter boxes, and other components in optical systems typically have a specified maximum, typical, and minimum anticipated loss based on the equipment design. In some cases, the minimum losses are not specified. Also, transmitters are specified to have a certain minimum and a certain maximum transmitted power. Transmission fibers also show different losses that could be from extra losses in patch panels, and/or if the fiber has been repaired, and/or from an unknown length of the fiber. The minimal input power to a receiver can be determined using the minimum possible transmitted power and then assuming all maximum losses. In a similar way the maximum input power can be determined using the maximum transmitted power with all assumed minimum losses. Consequently, in many system cases there is a big variation between the possible maximum and minimum power value that will reach a receiver. Often this min/max calculation will be outside the receivers' dynamic range, especially also considering uncertainty of the fiber losses.

Therefore, in conventional systems, problems occur when commissioning the appropriate level of channel power into receivers in WDM optical systems. Upstream client signals may not have the right power levels that are within the dynamic range of the client receivers. For example, the power of optical signals downstream may be too high and may saturate and/or overload the client receivers, such as when fibers are short (because there is less loss over a shorter fiber versus a longer fiber). As another example, the power of optical signals downstream may be too low to be bit error free.

Conventionally, systems may require that fiber losses be measured or estimated before use. Also, conventional systems may require that all system components, including the optical fibers, have known losses so that a single determined gain can be used for each particular network.

One conventional method to address these problems is to determine the needed gain for the amplifiers in the headend node for upstream and downstream transmissions in order to achieve the right client power levels from the headend module and from the tailend module. However, in conventional methods, before commissioning the system, the user must measure the fiber loss for the working connection and the protecting connection in the optical network, assume a loss value (from a specified minimum or maximum loss) for the tailend module, and assume (from the specification of the transmitters) the transmitted power levels from the transmitters.

The conventional methods have inaccuracies in the calculations of losses and gains. For example, the transmitters typically have at least 2 dB variation transmitted power, and more normally, have 4 dB of possible transmitted power variation. As another example, downstream modules can have greater than 3 dB variations of loss from one downstream module to another downstream module (or more, if wavelength dependent losses between channels are included).

Additionally, the losses for the optical fiber connections can be measured with an accuracy of approximately 1 dB, and the measurement is even less accurate if the measurement is based on just the fiber length, especially if patch panels and other components are included. Moreover, the filters and the amplifiers in the headend module have a wavelength dependency and an absolute gain inaccuracy. The total power inaccuracy can therefore be significant when determining losses and gain for optical signals traveling bidirectionally. Further, it is time consuming and troublesome to determine or measure the losses for the optical fibers.

Another conventional method is to first set up the system and measure the client signal power levels at the headend as well as the tailend. Then the booster amplifier gain and the preamplifier gain are adjusted to achieve suitable power levels that are within the receivers' dynamic range. However, this method takes more time and would require more staff during commissioning, since a commissioning engineer is needed both in the headend site as well as in the tailend site for this method.

Yet another conventional method is to have detectors (such as pin diodes) at each client port that detect the client power level. However, this method is expensive and can only be applied at the upstream node in a system where the upstream node is active and the downstream node is passive. Since passive nodes are not managed, the system cannot implement pin diodes with the passive nodes and does not have the capability to read the power values at the passive node.

Consequently, it is very difficult in conventional systems and methods for the user to determine the power level needed to be within the operating range for the headend transceivers or the tailend transceivers. For example, estimation of power losses in order to set the gain for the headend module is inaccurate, while measuring client signals with a power meter is time consuming and is costly.

SUMMARY

Systems and methods are disclosed addressing the problems of setting power levels to avoid too high or too low power in Wave-Division Multiplexing optical systems. The present disclosure addresses problems that occur in commissioning proper channel power into receivers at the two sides in the Wave-Division Multiplexing optical system. In one embodiment, a system consistent with the present disclosure utilizes a mean transmitted power and mean channel losses (that is, average power per channel and average loss per channel) when determining and setting the upstream and downstream gain. In one embodiment, the system comprises an active side (headend) that includes an active headend node comprising a booster and a preamplifier together with one or more filters, and a passive side (tailend) that includes a tailend node comprising one or more passive optical multiplexing/demultiplexing filter.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 5 is an exemplary graphical user display showing exemplary power tuning in accordance with the inventive concepts of the present disclosure.

FIG. 6 is another exemplary graphical user display showing exemplary power tuning in accordance with the inventive concepts of the present disclosure.

DETAILED DESCRIPTION

Figure 1:
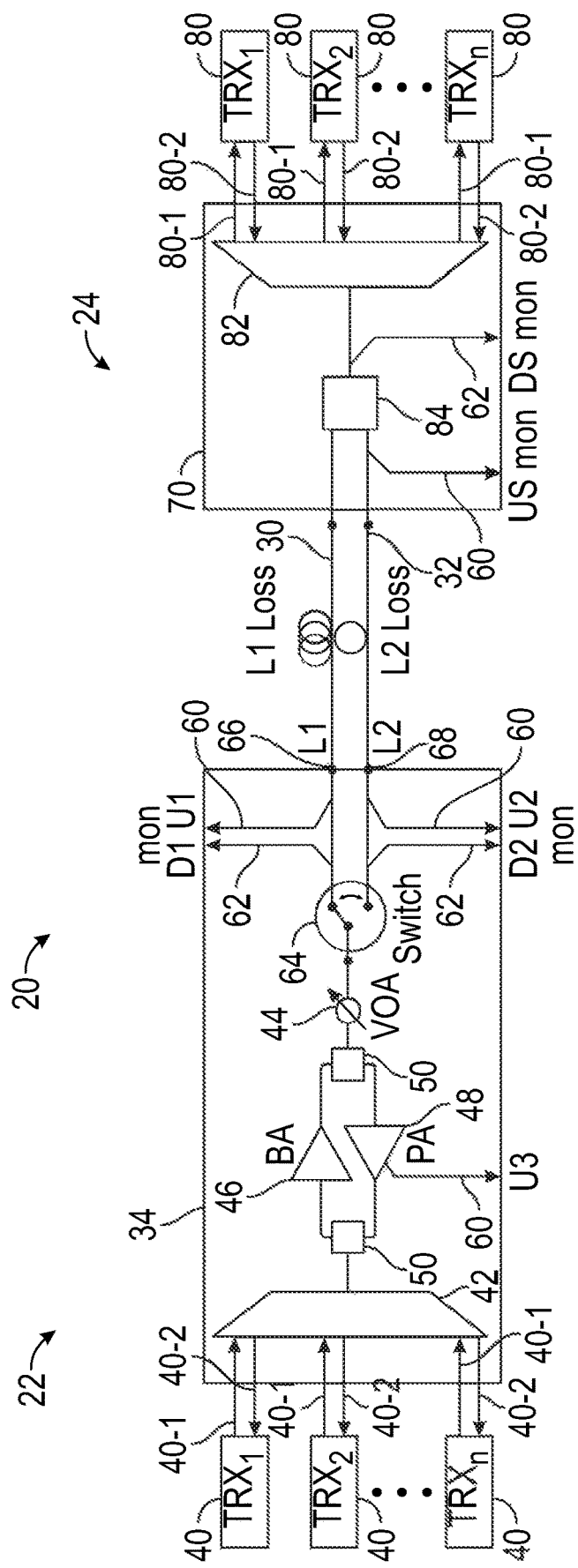
FIG. 1 is a schematic of an exemplary optical transmission system in accordance with the inventive concepts of the present disclosure.

The following detailed description refers to the accompanying drawings. The same reference numbers in different drawings may identify the same or similar elements.

The mechanisms proposed in this disclosure circumvent the problems described above. The present disclosure describes systems and methods for determining and setting upstream and/or downstream power gain in optical transmission systems.

In one exemplary embodiment, an optical transmission system may comprise a first node comprising components including one or more variable optical attenuator, one or more booster amplifier, one or more preamplifier, and one or more multiplexer-demultiplexer filter configured to transmit and receive optical signals with one or more first transceivers, wherein the first node made be associated with power loss measurement parameters indicative of power losses measured for one or more of the components of the first node; a second node comprising one or more multiplexer-demultiplexer filter configured to transmit and receive optical signals with one or more second transceivers; and a first bidirectional optical fiber between the first node and the second node configured to carry data traffic in optical signals in a first number of optical channels from the first node to the second node and a second number of optical channels from the second node to the first node; wherein power gain of the preamplifier of the first node is determined and set based on one or more of the power loss measurement parameters for the first node and on the second number of optical channels, in order to obtain a target client power of the optical signals transmitted to the first transceivers.

In one embodiment, the power gain of the preamplifier of the first node may be determined and set based further on an input power to the first node from the one or more second transceivers, the second number of optical channels carried on the first bidirectional optical fiber from the second node, and one or more of the power loss measurement parameters for the first node, to achieve the target client power to the one or more first transceivers.

In one embodiment, the power gain for the preamplifier in the first node may be determined and set based on subtracting the power of the optical signals coming from the one or more second transceivers from the target client power, adding ten times the logarithmic function base ten of the second number of optical channels carried on the first bidirectional optical fiber from the second node, and adding one or more power loss measurement parameters for the first node.

In one embodiment, the power loss measurement parameters for the first node may comprise a power loss that occurs in the components of the first node from a first line port into the first node from the first bidirectional optical fiber up to an input into the preamplifier plus the loss that occurs in the components of the first node from a point of output from the preamplifier through the first node and out of a filter of the first node to the one or more first transceivers.

In one embodiment, the power gain of the preamplifier of the first node may be re-determined and adjusted.

In one embodiment, a method may comprise: receiving power loss measurement parameters for components of an optical transmission system, the optical transmission system comprising: a first node comprising a preamplifier, the first node configured to transmit and receive optical signals on a first number of optical channels to and from one or more first transceivers; a second node configured to transmit and receive optical signals on a second number of optical channels to and from one or more second transceivers; and one or more bidirectional optical fiber configured to transmit the optical signals on the first and second number of optical channels between the first node and the second node. The method may further comprise determining, using one or more of the power loss measurement parameters and using the second number of optical channels from the second node, a power gain for the preamplifier in the first node; and setting a power setting of the preamplifier, using the determined gain for the preamplifier, in order to obtain a target client power of the optical signals transmitted to the one or more first transceivers from the first node.

In one embodiment, the power gain for the preamplifier in the first node may be determined based on subtracting the power of the optical signals from the one or more second transceivers from the target client power, adding ten times the logarithmic function base ten of the second number of optical channels from the second node, and adding one or more power loss measurement parameters for the first node.

In one embodiment, the power loss measurement parameters may comprise a power loss that occurs in components of the first node from a first line port into the first node up to an input into the preamplifier plus the loss that occurs in the components of the first node from a point of output from the preamplifier through the first node and out of a multiplex/demultiplex filter of the first node to the one or more first transceivers.

In one embodiment, the optical transmission system may further comprise a second bidirectional optical fiber between the first node and the second node configured to carry data traffic in optical signals between the first node and the second node; and wherein the power loss measurement parameters for the first node comprises the loss that occurs in the components of the first node from a second line port into the first node from the second bidirectional optical fiber up to an input into the preamplifier plus the loss that occurs in the components of the first node from a point of output from the preamplifier through the first node and out of a filter of the first node to the one or more first transceivers.

In one embodiment, a method may comprise: receiving power loss measurement parameters for components of an optical transmission system through which optical signals are transmitted between one or more transceivers of a first node in the optical transmission system and one or more transceivers of a second node over a first bidirectional optical fiber; measuring incoming power to the first node; determining, using the incoming power and a number of channels on the first bi-directional optical fiber from the second node to the first node, a maximum output power per channel; determining, using the received loss measurement parameters, a power gain for a booster amplifier in the first node; and setting the booster amplifier, using the determined gain for the booster amplifier, to a power level to achieve a client line gain that avoids one or more of saturating the one or more transceivers of the second node and providing a level of power insufficient for an optical signal to be received by the one or more transceivers of the second node without bit error.

In one embodiment, the gain for the booster amplifier in the first node may be determined by adding a mean loss of power per channel in channels from the first bidirectional optical fiber for transmitting the optical signals from the first node to the second node plus a loss of power from an output of the booster amplifier to the output of the first node plus a predetermined power value for a variable optical attenuator in the first node, wherein the mean loss of power per channel is determined by adding the power level from the one or more transceivers of the second node to ten times the logarithmic function base ten of the number of channels from the first node, and subtracting the amount of power from the first bidirectional optical fiber.

Definitions

If used throughout the description and the drawings, the following short terms have the following meanings unless otherwise stated:

dB stands for decibel. A decibel (dB) is a unit used to express relative differences in signal strength. A decibel is expressed as the base 10 logarithm of the ratio of the power of two signals. For example, $dB=10 \times Log\ 10\ (P1/P2)$, where Log 10 is the base 10 logarithm, and P1 and P2 are the powers to be compared.

dBm stands for decibel milliWatt, which is a unit of measurement of signal strength or power level. Zero dBm is defined as one mW (milliWatt) of power into a terminating load such as an antenna or power meter. Small signals are negative numbers (for example, −23 dBm).

The term "downstream" as used herein may refer to the passive side and/or a tailend node within the optical transmission system. "Downstream optical signals" may refer to optical signals that are being transmitted toward the direction of transceivers in the passive tailend side. "Downstream losses" may refer to loss of power of optical signals being transmitted toward the direction of transceivers in the passive tailend side.

Rx stands for Receiver, which typically refers to optical channel receivers, but can also refer to circuit receivers, and may be encompassed in a transceiver.

TRX stands for Transceiver, which can transmit and receive signals. The Transceiver may be referred to as having both transmission (or transmitter) and receiving (or receiver) functions and/or as a transmitter when used as such and/or as a receiver when used as such.

Tx stands for Transmitter, which typically refers to optical channel transmitters, but can also refer to circuit transmitters, and may be encompassed in a transceiver.

The term "upstream" as used herein may refer to the active side and/or a headend node of an optical transmission system. "Upstream optical signals" may refer to optical signals that are being transmitted toward the direction of transceivers in the active headend side. "Upstream losses" may refer to loss of power of optical signals being transmitted toward the direction of transceivers in the active headend side.

WDM stands for wave-division multiplexing, also known as wavelength-division multiplexing. DWDM stands for dense wave-division multiplexing.

DESCRIPTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

Further, the phrase "based on" is intended to mean "based, at least in part, on" unless explicitly stated otherwise.

Also, certain portions of the implementations have been described as "components" or "circuitry" that perform one or more functions. The term "component" or "circuitry" may include hardware, such as a processor, an application specific integrated circuit (ASIC), or a field programmable gate array (FPGA), or a combination of hardware and software. Software includes one or more computer executable instructions that when executed by one or more component cause the component or circuitry to perform a specified function. It should be understood that the algorithms described herein are stored on one or more non-transient memory. Exemplary non-transient memory includes random access memory, read only memory, flash memory or the like. Such non-transient memory can be electrically based or optically based. Further, the messages described herein may be generated by the components and result in various physical transformations.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As discussed above, the present disclosure addresses problems that occur in commissioning proper channel power into receivers at two sides in a Wave-Division Multiplexing (WDM) optical transmission system. Systems and methods consistent with the present disclosure may determine and set power gain such that a desired output power level to the client transceivers is achieved on one or both sides of the optical transmission system.

In one embodiment, in general, gain may be determined by measuring input power from the line and dividing that number by the number of present wavelength channels and comparing this determined input channel power to the wanted output channel power. The difference is the port-to-port wanted gain. Knowing the losses for the different ingoing components, the needed amplifier gain can be determined to obtain the port-to-port gain. The components of the optical transmission system can then be set to obtain the determined gain.

In one embodiment, systems consistent with the present disclosure may utilize a mean transmitted power and mean channel losses when determining the upstream and downstream gain. In one embodiment, the mean channel loss is the measured (calibrated in production) typical loss a channel will see, which is an average per channel loss over all the channels in the optical transmission system (for example, the average power loss over twenty channels).

Referring now to the drawings, FIG. 1 illustrates an exemplary embodiment of an optical transmission system 20 comprising an active side 22 (headend) and a passive side 24 (tailend) and one or more optical fibers. For exemplary purposes, the one or more optical fibers are illustrated as a first line (L1) 30 and a second line (L2) 32. In one embodiment, the first line 30 and the second line 32 may be bidirectional optical fibers, each configured for carrying data traffic in optical signals back and forth between the headend active side 22 and the tailend passive side 24.

For explanatory purposes, the active side 22 and/or the headend may be referred to as "upstream" while the passive side 24 and/or the tailend may be referred to as "downstream" within the optical transmission system 20. For example, the first line 30 may carry optical signals "downstream" from the headend active side 22 to the tailend passive side 24, and also may carry optical signals "upstream" from the tailend passive side 24 to the headend active side 22. Optical signals transmitted toward the headend active side 22 may be referred to as "upstream optical signals," while optical signals transmitted toward the tailend passive side 24 may be referred to as "downstream optical signals."

The active side 22 may include an active headend node 34. The active headend node 34 may comprise one or more transceivers 40 (which may also be referred to as one or more upstream transceivers 40). The headend node 34 and/or the one or more transceivers 40 may be configured to transmit output 40-1 data traffic in first optical signals with wavelengths in channels in one or more first wavelength band through the first line 30 or the second line 32. The headend node 34 and or the one or more transceivers 40 may be further configured to receive input 40-2 data traffic in second optical signals with wavelengths in channels in one or more second wavelength band. The one or more transceivers 40 may be CWDM, DWDM, or tunable DWDM transceivers, for example. The one or more transceivers 40 may be considered part of the headend node 34 and/or separate from the headend node 34.

The headend node 34 may further comprise one or more multiplexer/demultiplexer filter 42 configured to demultiplex/multiplex the optical signals to/from the one or more transceivers 40. The filter 42 may be referred to herein as a multiplexer/demultiplexer filter 42 or simply as filter 42. In one embodiment the filter 42 may be one or more array wave-guide (AWG) filter. The headend node 34 may further comprise one or more of the following components: one or more variable optical attenuator (VOA) 44, one or more booster amplifier 46, one or more preamplifier 48, one or more red-blue filter 50. Alternatively, the one or more red-blue filter 50 may be one or more optical circulator or one or more optical interleaver.

In one embodiment, the one or more red-blue filter 50 may be a thin-film filter. In one embodiment, the one or more red-blue filter 50 may filter optical signals having red wavelengths (long wavelengths) going downstream and may filter optical signals having blue wavelengths going upstream in the optical transmission system 20. In this way, the blue upstream wavelengths may be directed to the preamplifier 48 and the red downstream wavelengths may be directed to the VOA 44.

In one embodiment, the headend node 34 may have two VOAs 44, a first VOA 44 in the first line 30, and a second VOA 44 in the second line 32.

In one embodiment, the preamplifier 48 may be a variable gain amplifier, which maintains its characteristics (mainly flat wavelength gain) for different gain settings. An alternative to a variable amplifier is a fixed gain amplifier in combination with a VOA. However, this solution may result in a worse Optical-Signal-to-Noise-Ratio (OSNR) for the upstream channels. The preamplifier 48 may have a limited dynamic range. When line losses and downstream (DS) filter losses are low, the preamplifier 48 (PA) may not be able to be set to a desired (low) value. In these cases, the VOA 44 may be used to add an extra attenuation value for both when the first line 30 is used and when the second line 32 is used.

In one embodiment, the booster amplifier 46 may be a fixed gain amplifier preceded by another VOA (not shown). In that case, the VOA may be used to obtain different gains. An alternative is to use a variable gain amplifier as a booster. Both the booster amplifier 46 and the preamplifier 48 may be used in conjunction with the VOA 44. Changing the gain setting of the preamplifier 48 and/or the booster amplifier 46 may compensate for different fiber losses to achieve a desired output power from the client side and from the line side of the optical transmission system 20.

In one embodiment, the headend node 34 may further comprise one or more upstream monitor port 60 which may be used to connect devices to monitor the optical power transmitted from the passive side 24 (tailend) upstream toward the headend node 34 and/or one or more downstream monitor port 62 which may be used to connect devices to monitor the optical power transmitted from the tailend passive side 24 upstream toward the headend active side 22.

In one embodiment, the headend node 34 may further comprise one or more switch 64. The switch 64 may be configured to switch data traffic between the first line 30 and the second line 32. The headend node 34 may transmit power equally through the first line 30 and the second line 32, depending on which line is connected through the switch 64.

In one embodiment, the headend node 34 may further comprise a first line port 66, where the first line 30 enters the headend node 34. In one embodiment, the headend node 34 may further comprise a second line port 68, where the second line 32 enters the headend node 34.

The passive side 24 (tailend) of the optical transmission system 20 may include a tailend node 70. The tailend node 70 may comprise one or more transceivers 80 (which may also be referred to as one or more downstream transceivers 80). The tailend node 70 and/or the one or more transceivers 80 may be designed to receive input 80-1 data traffic in the first optical signals with wavelengths in channels in the one or more first wavelength band through the first line 30 or the second line 32 from the headend node 34. The tailend node 70 and/or the one or more transceivers 80 may further be designed to transmit output 80-2 data traffic in the second optical signals with wavelengths in channels in the one or more second wavelength band. The one or more transceivers 80 may be CWDM, DWDM, or tunable DWDM transceivers, for example. The one or more transceivers 80 may be considered part of the tailend node 70 and/or separate from the tailend node 70.

The tailend node 70 may further comprise one or more multiplexer/demultiplexer filter 82 designed to demultiplex/multiplex the optical signals to/from the one or more transceivers 80. The multiplexer/demultiplexer filter 82 may be referred to herein as simply the filter 82. In one embodiment the filter 82 may be one or more thin-film filter. In one embodiment, the filter 82 may be one or more arrayed waveguide grating (AWG) filter. The tailend node 70 may further comprise one or more coupler 84, such that half of the power from the transceiver 80 goes to the first line 30 and half of the power from the transceiver 80 goes to the second line 32. In one embodiment, the tailend node 70 may further comprise one or more of the upstream monitor port 60 and/or the downstream monitor port 62.

In one embodiment, when the transceivers 40 at the upstream headend node 34 are preceded with the preamplifier 48, the transceivers 40 may be Optical-Signal-to-Noise-Ratio (OSNR) limited (where noise is measured over 0.1 nm optical bandwidth). The range where an OSNR-limited transceiver can operate is normally around 10 dB. In one embodiment, the transceivers 80 in the tailend node 70 are power limited. The range where these transceivers 80 may operate may be approximately 13 dB. In one embodiment, the upstream transceivers 40 have a dynamic range (OSNR limited) and the downstream transceivers 80 have a dynamic range (power limited) so that the upstream transceivers 40 and downstream transceivers 80 are within set power ranges.

The optical transmission system 20 may use bidirectional single-fiber transmission in that the headend node 34 may transmit data traffic in wavelengths in channels "downstream" to the tailend node 70 in the first wavelength band, and the tailend node 70 may transmit data traffic in wavelengths in channels "upstream" to the headend node 34 in the second wavelength band on the same optical fiber, such as the first line 30. The tailend node 70 may also transmit the same optical signals in the second wavelength band on the second line 32. For example, the headend node 34 may transmit twenty channels downstream to the tailend node 70, and the tailend node 70 may transmit twenty channels upstream toward the headend node 34 on the first line 30 and the same twenty channels on the second line 32.

In one embodiment, the first line 30 may be a working path that carries bidirectional data traffic between the headend node 34 and the tailend node 70 in an optical transmission system when there is no failure in the first line 30. The second line 32 may be a protecting path that carries the bidirectional data traffic between the headend node 34 and the tailend node 70 when there is a failure in the first line 30. However, the present disclosure may be applicable to an unprotected system with a working path but no protecting path, for example. Further, although the described system is a bidirectional single-fiber system, the disclosure also may be used in a two-fiber system, where each fiber carries optical signals propagating from one direction (i.e., upstream or downstream).

In use, the active headend node 34 may transmit optical signals from the transceiver 40, through the filter 42 to multiplex the optical signals, through the red-blue filter 50, to the booster amplifier 46. The booster amplifier 46 may increase the power of the optical signals. In one embodiment, the optical signals may be transmitted from the booster amplifier 46 through another red-blue filter 50. In one embodiment, the optical signals may be transmitted downstream through the VOA 44. The VOA 44 may be used to decrease the power of the optical signals.

The active headend node 34 may be configured to transmit and receive data traffic in optical signals on either the first line 30 or the second line 32. In one embodiment, the headend node 34 may transmit and receive the data traffic in optical signals on the first line 30 as long as there is no failure in the first line 30. If there is a failure in the first line, the headend node 34 may activate the switch 64 (or electrically switch) to switch to the second line 32, and then may transmit and receive the data traffic in the optical signals on the second line 32.

The passive tailend node 70 may receive data traffic from the headend node 34 through either the first line 30 (for example, when there is no failure of the first line 30) or the second line 32 (for example, when there is a failure of the first line 30). In one embodiment, the optical signals may be transmitted through the coupler 84 to the filter 82, where the optical signals may be demultiplexed, and transmitted to the one or more transceivers 80 of the tailend node 70.

The tailend node 70 may transmit optical signals from the one or more transceivers 80 through the filter 82 of the tailend node 70 into both the first line 30 and the second line 32. However, as only one of the first line 30 and the second line 32 is connected through the switch 64, only the optical signals transmitted through the connected one of the first line 30 and the second line 32 are transmitted through the switch 64 of the headend node 34 to the VOA 44 of the headend node 34. The VOA 44 may be configured to decrease the power of the optical signals. In one embodiment, the optical signals may be transmitted through the red-blue filter 50 of the headend node 34. Then the optical signals may be directed to the preamplifier 48. The preamplifier 48 may increase the power of the optical signals (gain). The optical signals may then move through another red-blue filter 50. Next, the optical signals may move through the filter 42 of the headend node 34 which may demultiplex the optical signals for transmission to the upstream transceivers 40 of the headend node.

Figure 2:
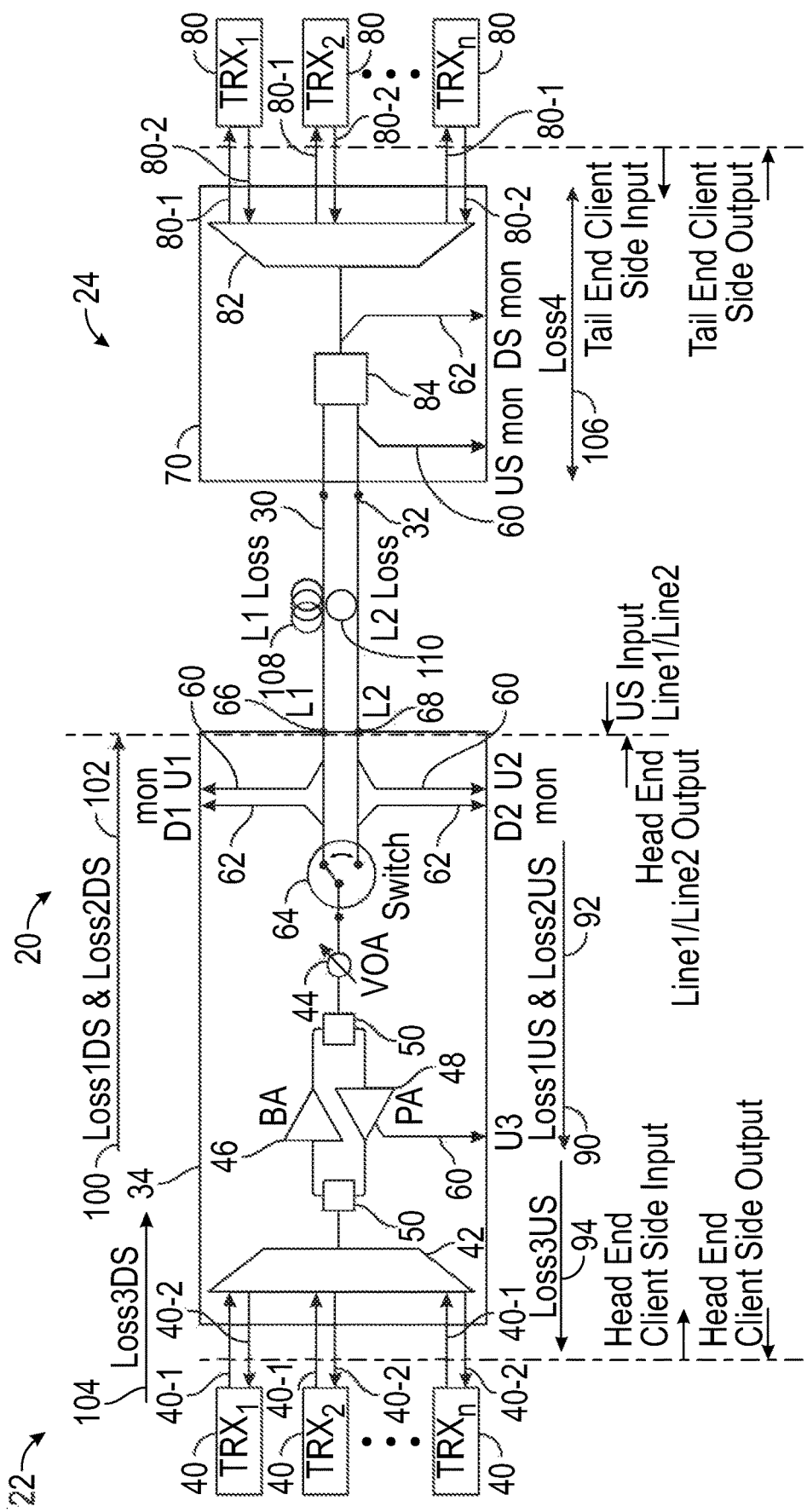
FIG. 2 is another schematic of the exemplary optical transmission system of FIG. 1.

As illustrated in FIG. 2, components of the optical transmission system 20 may intrinsically cause loss of power of the optical signals as the optical signals move through the components and the optical transmission system 20. For exemplary purposes, the losses in the exemplary embodiment of FIG. 2 may be categorized in the active side 22 as a first upstream loss (Loss1US) 90, a second upstream loss (Loss2US) 92, and a third upstream loss (Loss3US) 94, which are losses of optical power of optical signals moving upstream through the components of the headend node 34. For exemplary purposes, the losses may be further categorized in the active side 22 as a first downstream loss (Loss1DS) 100, a second downstream loss (Loss2DS) 102, and a third downstream loss (Loss3DS) 104, which are losses of optical power of optical signals moving downstream through the components of the headend node 34.

More particularly, in one embodiment, the first upstream loss (Loss1US) 90 may be the loss that occurs in the components of the headend node 34 from the first line port 66 into the headend node 34 up to input into the preamplifier 48. The second upstream loss (Loss2US) 92 may be the loss that occurs in the components of the headend node 34 from the second line port 68 into the headend node 34 up to input into the preamplifier 48. The third upstream loss (Loss3US) 94 may be the loss that occurs in the components of the headend node 34 from a point of output from the preamplifier 48 through the filter 42.

In one embodiment, the first downstream loss (Loss1DS) 100 may be the loss that occurs in the components of the headend node 34 from output of the booster amplifier 46 to the first line port 66 out of the headend node 34. The second downstream loss (Loss2DS) 102 may be the loss that occurs in the components of the headend node 34 from output of the booster amplifier 46 to the second line port 68 into the headend node 34. The third downstream loss (Loss3DS) 104 may be the loss that occurs in the components of the headend node 34 from when the optical signals enter the filter 42 to when they enter the booster amplifier 46. It will be understood that in embodiments in which the booster amplifier 46 comprises a fixed gain amplifier and a VOA (not shown), that the first downstream loss (Loss1DS) 100 and the second downstream loss (Loss2US) 102 would include the loss from that combination of components. It will be further understood that other combinations of components losses are contemplated.

The losses in the exemplary embodiment may be further categorized for optical signals moving toward the upstream active side 22 in the downstream side 24 as a fourth loss (Loss4) 106. More particularly, in one embodiment the fourth loss 106 (Loss4) may comprise the loss of power from a point of input of the optical signals into the filter 82 of the tailend node 70 to a point of output of the optical signals from the tailend node 70.

Additionally, a first line loss (L1Loss) 108 may occur as the optical signals move through the first line 30 and a second line loss (L2Loss) 110 may occur as the optical signals move through the second line 32. The first line 30 and the second line 32 may have the same amount of loss or different amounts of loss, based on the configuration of the first line 30 and the configuration of the second line 32. One non-exclusive example of the configuration of the first line 30 and the second line 32 is the length of the first line 30 and the second line 32.

The first upstream loss (Loss1US) 90, the second upstream loss (Loss2US) 92, the third upstream loss (Loss3US) 94, the first downstream loss (Loss1DS) 100, the second downstream loss (Loss2DS) 102, the third downstream loss (Loss3DS) 104, the fourth loss (Loss4) 106, the first line loss (L1Loss) 108, and the second line loss (L2Loss) 110 may be measured. For example, during production of the components of the optical transmission system 20 the actual losses that occur through the components may be measured. Measuring these losses is more accurate than utilizing the maximum possible loss specified by the manufacturer of the components, since the actual losses may be less than the maximum possible losses.

The losses of the components may differ from component to component used in optical transmission systems 20. For example, the loss that may occur in the filter 82 of the tailend node 70 of one optical transmission systems 20 may be different from the loss that may occur in the filter 82 of another optical transmission system 20. The difference in the losses between two or more of the same type of component may be caused by manufacturing tolerances or particular configurations, for example. Measuring the losses of the components is more accurate than assuming a loss is consistent from component to component. The measurements are not done for each channel, but instead are indicative of the average loss for a channel. Since the measured loss values result in average loss per channel, some small variations of loss values may occur between the channels.

Measuring the power input level helps compensate for deviations from assumed transmitted power levels and assumed power loss from the tailend node 70, the first line 30, the second line 32 (fiber variations), and the transmitted power from the tailend node 70 (in order to output a predetermined target power from the transceivers 40 of the headend node 34).

In general, in one embodiment, to determine a gain for transmission of optical signals upstream through the optical transmission system 20, a user may use the transceivers 80 of the passive tailend node 70 to transmit through the first line 30 upstream to the active headend node 34. The input power for this transmission may be measured. A desired output power to the transceivers 40 and power levels for the channels may be determined. Then, the preamplifier 48 may be set to adjust the power of the optical signals to correspond to the wanted per-channel power. For example, for ten channels, if the desired output is −15 dBm, the preamplifier 48 may be set to −5 dBm (that is, −15 dBm/ch+10 dB=−5 dBm) plus a calculated additional amount of power to account for loss of power that takes place in the components of the optical transmission system 20 between the transmission of the optical signals and the receipt of the optical signals. In other words, the amount of power may be determined based on the number of channels and the total desired power output plus the determined amount of power loss for the optical transmission system 20.

In one embodiment, the system or method may receive or retrieve measurements of the upstream losses (that may be measured in production of one or more components of the headend node 34 and stored in the headend node 34), determine the gain needed from the preamplifier 48 in order to meet a desired target client power to be transmitted to the one or more transceivers 40 of the headend node using the upstream losses and the number of channels in the optical transmission system 20, and set the preamplifier 48 using that determined preamplifier gain, in order to obtain the desired target client power to be transmitted to the one or more transceivers 40 of the headend node 34.

In one embodiment, the system or method may determine the losses from the tailend node 70 through the filter 82, the coupler 84, and the first line 30 or the second line 32 (that is Loss4 160 plus either L1Loss 108 or L2Loss 110), determine the gain needed from the booster amplifier 46 to transmit the optical signals downstream to the transceivers 80 (without saturating the transceivers 80 or under-powering the optical signals) using the downstream losses, and set the booster amplifier 46 using that determined booster amplifier gain, in order to avoid saturating the transceivers 80 of the tailend node 70 and to avoid providing too little power for the optical signals being transmitted to the transceivers 80 of the tailend node 70.

In one embodiment, the gain of the booster amplifier 46 may be initially set to utilize the maximum power when a maximum number of desired channels are in use (for transmission of optical signals through the first line 30 or the second line 32) in the optical transmission system 20, then, using the downstream losses (for example, the first downstream loss Loss1DS 100, in some cases, possible extra configured losses at the VOA 44, the first line loss 108, and the fourth loss Loss4 106), the determination of the gain of the booster amplifier is conducted, and the gain of the booster amplifier 46 is set.

Measurements of the upstream losses from production may be stored as measurement loss parameters. Determining the measurements may comprise measuring power loss of an optical signal through one or more components of the headend node 34 during production, by starting with a known power at the input of the one or more components (or string of components) and measuring the change at the output of the one or more components (or string of components), which is well known to persons having ordinary in the art.

In one embodiment, the VOA 44 of the headend node 34 is configured to balance the power for the first line 30 and the power for the second line 32. For example, if data traffic is switched to the second line 32, the VOA 44 may be configured to balance the power of the optical signals going to the preamplifier 48 so that the preamplifier 48 will see the same input power, regardless of whether the optical signals are transmitted on the first line 30 having a first line loss 108 or the second line 32 having a second line loss 110. If the data traffic is switched from the first line 30 to the second line 32 (or back from the second line 32 to the first line 30), the optical transmission system 20 may change the setting of the VOA 44 to a new value that equalizes the power into the preamplifier 48, by changing the amount the VOA 44 decreases the power of the optical signals moving through the VOA 44.

In one embodiment, the headend node 34 of the optical transmission system 20 may have two different VOAs 44, each working so the preamplifier 48 receives the same input power regardless which line is used. In that case, a new power value for the VOA 44 does not have to be synchronized with the switching event. However, the use of one VOA 44 reduces the cost and enables a lower insertion loss if other non-amplified channel(s) are inserted next to the switch 64.

In one embodiment, the optical transmission system 20 may further comprise one or more pin diodes (not shown) positioned to receive optical signals through the upstream monitor ports 60 and/or the downstream monitor ports 62. The pin diode(s) may be calibrated to determine the input power levels at the input first line port 66 and/or the second line port 68 of the respective first line 30 and/or second line 32.

In one embodiment, determination and setting of gain of the optical transmission system 20 may be based at least in part on the desired output power per channel on the client side (that is, client output control). For example, if the number of active channels is known, the required power output from the preamplifier 48 to obtain a certain channel power to the transceivers 40 can be determined. In other words, if the number of active channels is known, the required gain for the preamplifier 48 to achieve the wanted client power out from the headend node 34 to the transceivers 40 may be determined. In embodiments in which the first line 30 is a working path and the second line 32 is a protecting path, and rapid switching is desired, the gain of the preamplifier 48 may be the same regardless if the first line 30 (Line1) or the second line 32 (Line 2) is used, because the VOA 44 may be utilized to compensate for the differences between the first line 30 and the second line 32.

In one embodiment, the gain for the preamplifier 48 (PAGain) may be determined using the following equation (Equation 1):

$$PAGain = \text{Client target} - L1power + 10 * LOG\,10(\text{number of channels going upstream}) + Loss1US + Loss3US$$

where "Client target" is the desired output power per channel to the transceivers 40, where "L1 power" is the power input into the first line 30, where Loss1US is the first upstream loss 90 and Loss3US is the third upstream loss 94, where the number of channels going upstream is the number of channels going from the tailend node 70 toward the headend node 34. The first upstream loss 90 and the third upstream loss 94 are internal losses in the headend node 34 and may be measured in production of the components. The VOA 44 may be assumed to be 0 dB. The loss values are average channel losses, which is why some small variations may occur between the channels. The measurements are not done per channel, but instead are indicative of the average loss a channel will see. For example, if Loss1US is calibrated to 2 dB, Ch1 may have 2.2 dB, Ch2 may have 2.1 dB; Ch 3 may have 1.9 dB; Ch4 may have 1.8 dB, and so on.

As one example of a calculation of gain to which to set the preamplifier 48, if there are ten channels and a desired client output power of −7 dBm (that is, the target output power to the upstream transceivers 40), and if there is −17 dBm total power into the first line 30 (L1), then the preamplifier gain (PAGain) could be determined using Equation 1, as shown below:

$$\text{PAGain} = \text{Client target} - \text{L1 power} + 10*\text{LOG }10(\text{number of channels going upstream}) + \text{Loss1US} + \text{Loss3US}$$

$$= -7\text{ dBm} + 17\text{ dBm} + 10*\text{LOG }10(10) + \text{Loss1US} + \text{Loss3US}$$

where, again, Loss1US is the first upstream loss 90 and Loss3US is the third upstream loss 94.

As other examples, the client power target ("Client target") to the one or more transceivers 40 from the upstream headend node 34 may be in a range from approximately −10 dBm to approximately −20 dBm or in a range from approximately −3 dBm to approximately −17 dBm.

In one embodiment, if the number of channels in the optical transmission system 20 changes, the gain for the preamplifier 48 (PAGain) may be determined again using the above equations. Though this recalculation is not necessary, the recalculation may fine-tune the optical transmission system 20 by taking into account possible changes in the components of the optical transmission system 20 (for example, after a fiber repair the fiber losses might have increased).

If desired, the above method may be carried out without disrupting data traffic. For example, if the optical transmission system 20 has been commissioned with one channel, for example, and it is desired to fine-tune the optical transmission system 20 again when the optical transmission system 20 is changed to have, for example, twenty channels, the gain of the preamplifier 48 may be determined and set without disrupting data traffic being transmitted through the optical transmission system 20.

In one embodiment, determination and setting of gain of the booster amplifier 46 of the optical transmission system 20 (in order to control the power of the optical signals transmitted downstream to the transceivers 80 of the tailend node 70) may be based at least in part on the one or more transceivers 80 of the downstream passive side 24. More particularly, in one embodiment the one or more transceivers 80 may be used to determine the first line loss (L1Loss) 108 and the fourth loss (Loss4) 106. This power loss determination may be used, if needed, to decrease the booster amplifier 46, i.e. lower the downstream channel power to not saturate the downstream transceivers 80, or to increase the power provided by the booster amplifier 46 in order to provide sufficient power for the optical signals to reach the downstream transceivers 80 without bit errors.

For example, if the first line 30 (L1) is a long fiber and the second line 32 (L2) is a short fiber, the losses in, and therefore the input power to the preamplifier 48 from, the first line 30 and the second line 32 will differ. In such a case, as previously described, the VOA 44 may be adjusted for the second line 32 to provide a relative high attenuation to "equalize" the input power to the preamplifier 48, such that the power from the first line 30 and the second line 32 is the same or substantially the same. Likewise, given that downstream and upstream fiber losses are symmetrical in bidirectional single fibers (i.e., optical signals counter-propagate in each fiber), applying the same difference in attenuation in the downstream direction (using the booster amplifier 46) as in the upstream direction will equalize the received power in the tailend node 70 whether the optical signal is being transmitted on the first line 30 or the second line 32. Consequently, the downstream transceivers 80 will not be saturated.

However, there are cases where the transmitted power out from the booster amplifier 46 may saturate the transceivers 80 of the tailend node 70, unless the power of the booster amplifier 46 is decreased. For example, when both fibers are short, attenuation of the VOA 44 will be relatively low. Consequently, the transmitted channel power will be high unless the gain/power of the booster amplifier 46 is decreased. The maximum transmitted power out from the booster amplifier 46 may be determined based on the power losses incurred by optical signals transmitted from the transceivers 80 of the tailend node 70 to the first line port 66 and the second line port 68. In one embodiment, the power levels may be determined with an approximate loss value, assuming a transmitted power value from the transceivers 80 (for example, APDs) of the tailend node 70.

The mean losses per channel between the transceivers 80 of the tailend node 70 and the first line 30 (Line1) can be determined using the following equation (Equation 2):

$$\text{Fiber\&FilterLoss} = \text{Txpower} + 10*\text{LOG }10(\text{number of channels going downstream}) - \text{L1 power}$$

where "Txpower" is the power from the transceivers 80, where the number of channels going downstream is the number of channels going from the headend node 34 toward the tailend node 70, and where "L1 power" is the power input into the first line 30 from the tailend node 70. The booster amplifier 46 may be can be implemented as a true variable gain amplifier. However, it may be more cost effective to implement the booster amplifier 46 as a fixed gain amplifier preceded by a VOA 44, which allows the user to set a different total gain. It will be understood that typically the number of channels going downstream is equal to the number of channels going upstream; however, during a commissioning phase the number of channels going downstream may be different than the number of channels going upstream.

As one example, in a system in which the transceivers 80 of the tailend node 70 is an APD with a dynamic range of −8 to −22 dBm, it may be desirable to set the maximum target output power for the tailend client passive side 24 (see FIG. 2) to −12 dBm, for example, in order to give some margins to −8 dBm. Additionally, in one example, a maximum client power target to the one or more transceivers 80 from the downstream tailend node 70 may be predetermined at a level of a few dBm above a saturation level of the transceivers 80.

The maximum allowed headend line output ("L1DS", that is, the output power level moving downstream from the headend node 34) at the first line port 66 may be determined, therefore, using the following equation (Equation 3):

$$\text{L1DS} = -12\text{ dBm} + 10*\log 10(\text{number of channels going downstream}) + \text{Fiber\&FilterLoss}$$

where the number of channels going downstream is the number of channels going from the headend node 34 toward the tailend node 70.

Consequently, the output power from the booster amplifier 46 can be determined using the following equation (Equation 4):

$$\text{Booster amplifier output power} = \text{L1DS} + \text{Loss1DS} + \text{VOAsetting}$$

where VOAsetting is a set value for the first line 30 when the client output power of the headend node 34 was determined, and where Loss1DS is the first downstream loss 100.

Knowing the input power for the booster amplifier 46 (for example, the input power to the booster amplifier 46 may be measured internally), the gain for the booster amplifier 46 can then be determined and set to obtain the desired power needed to not saturate the downstream transceivers 80 of the tailend node 70, and to provide enough power for the optical signals to reach the downstream transceivers 80 of the tailend node 70 without bit error.

The same calculation can be made for the second line 32, but is not necessary if the calculation has been done for the first line 30.

Therefore, the gain for the preamplifier 48 and/or the booster amplifier 46 may be set and controlled to achieve the right power levels for the client output on the headend active side 22 and the transceivers 80 of the tailend node 70 of the passive side 24, respectively. Accordingly, channels may be added or removed without affecting other channels.

Figure 3:
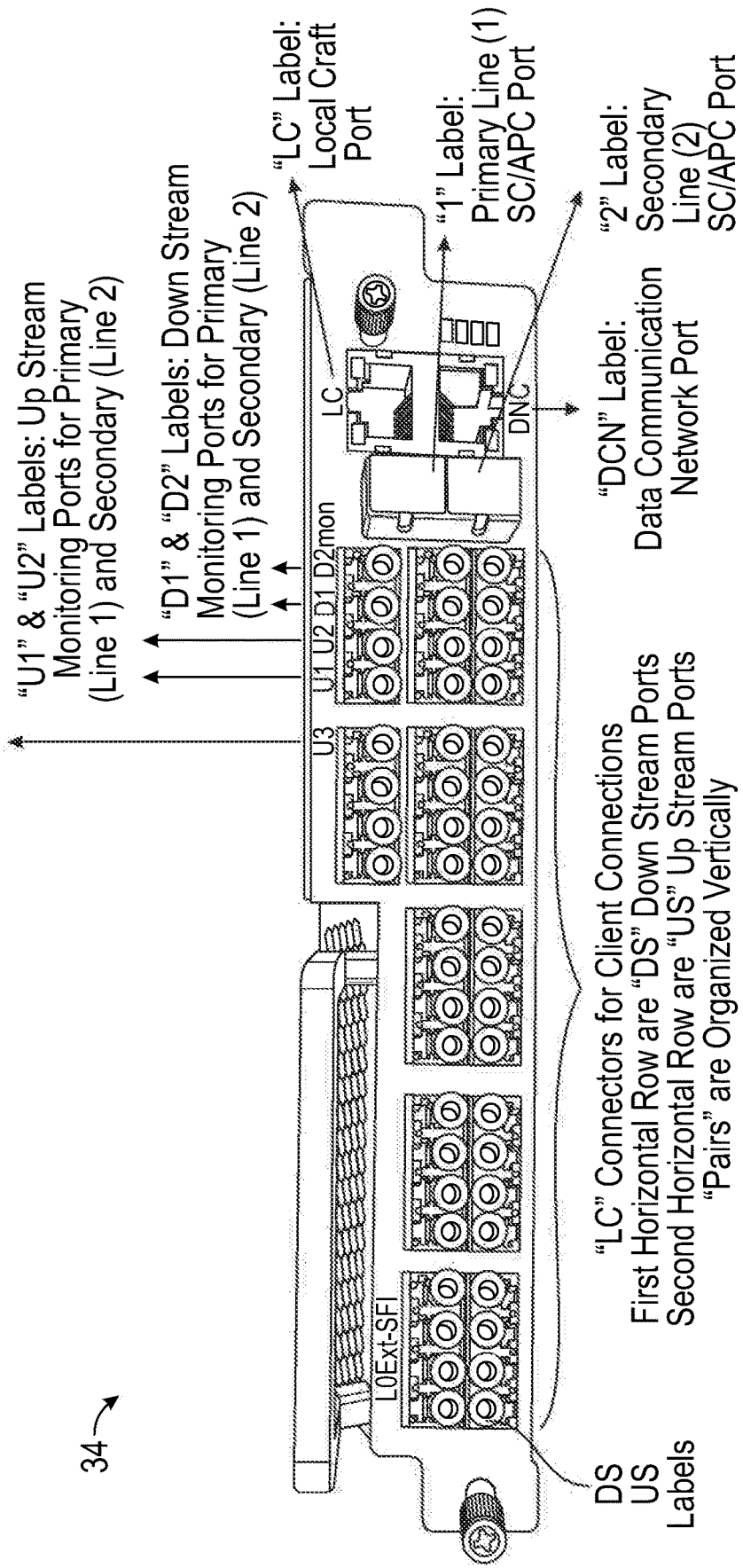
FIG. 3 is an illustration of exemplary hardware for components of an exemplary optical transmission system in accordance with the inventive concepts of the present disclosure.

FIG. 3 depicts hardware that may be used for the headend node 34 in one exemplary embodiment. In the example shown, two headend nodes 34 are sitting in a casing (that is, a "Pizza box") which may have further comprise one or more fan and one or more power supply.

Figure 4:
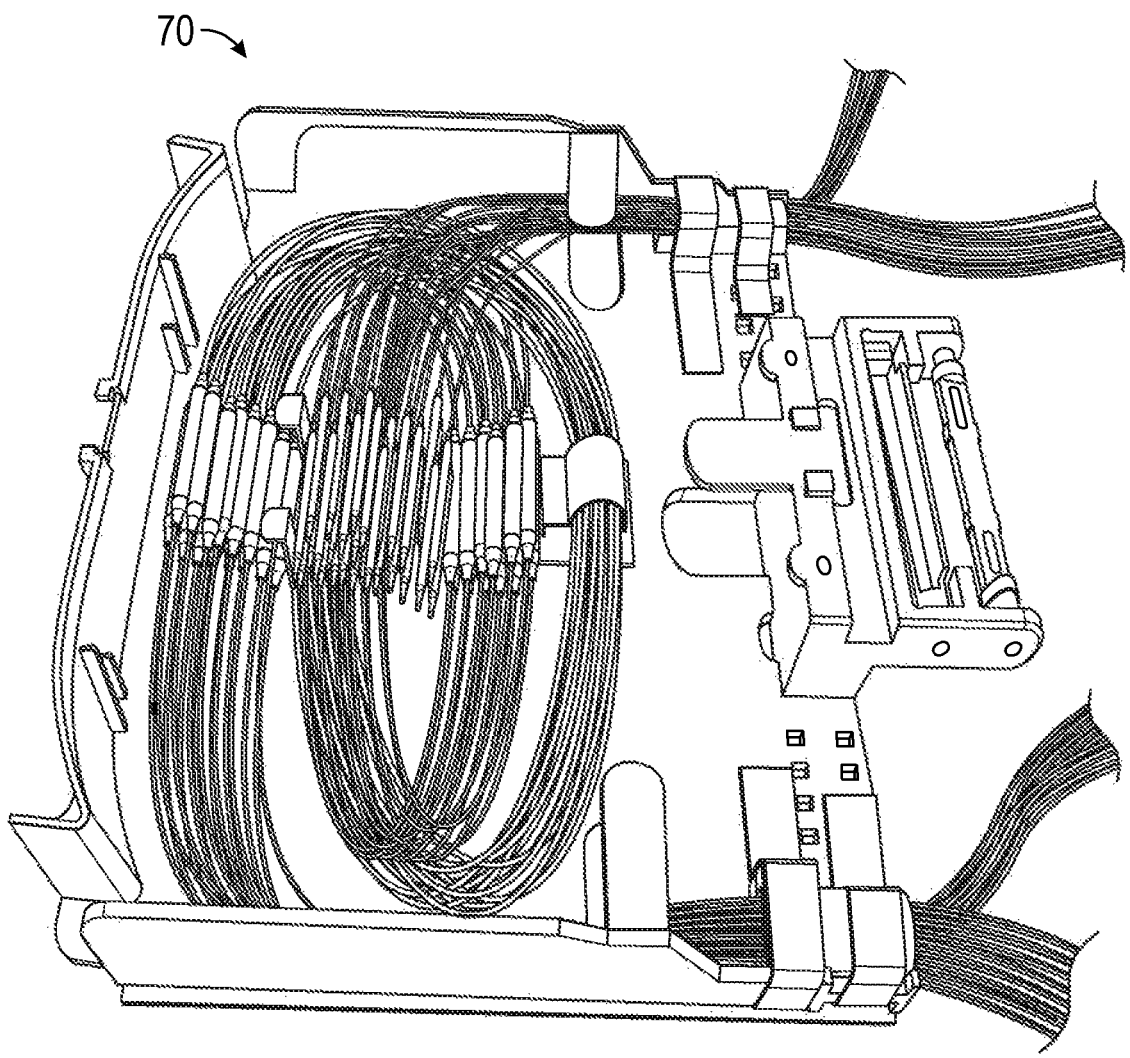
FIG. 4 is an illustration of additional exemplary hardware for components of an exemplary downstream passive tailend node of an exemplary optical transmission system in accordance with the inventive concepts of the present disclosure.

FIG. 4 depicts one exemplary embodiment of a hardware implementation of the downstream passive tailend node 70 adding and dropping twenty channels. Both the headend node 34 and the downstream passive tailend node 70 may also support passive add/drop of GPON/10GPON.

Software control of optical transmission system 20 in accordance with the present disclosure can be managed and controlled via command line interface (CLI) or via a graphical user interface (GUI), for example. An exemplary embodiment of a GUI 120 for use with the "power tuning" described herein is shown in FIGS. 5 and 6.

FIGS. 5 and 6 will be used to illustrate examples of power control for optical channels in optical transmission systems 20.

FIG. 5 depicts an exemplary graphical user interface 120 illustrating "Power tuning" for the optical transmission system 20, in which the first line 30 is a long optical fiber and the second line 32 is a shorter optical fiber than the first line 30. In this example, the optical transmission system 20 utilizes the second line 32 to transmit and receive optical signals, and the VOA 44 is set to 9.23 dB. This prevents the transceiver 80 of the tailend node 70 from being saturated.

FIG. 6 depicts the exemplary graphical user interface 120 illustrating "Power tuning" for an optical transmission system 20 in which the first line 30 and the second line 32 are short optical fibers. In this case, the gain is determined by assuming that the transmitted power is +1 dBm from the transceiver 80 of the tailend node 70. The input power per channel is approximately −13 dBm. Consequently, the downstream filter loss (the fourth loss 106) and the fiber losses (the first line loss 108 and the second line loss 110) are about 14 dB. The target −12 dBm plus 14 dB gives consequently a Line output target of 2 dBm per channel average power. The gain of the booster amplifier (BA) 46 is then adjusted to reach +2 dBm/channel at the first line 30 and the second line 32. It will be understood that these rounded numbers and examples are given for exemplary purposes, and that actual calculations may differ based on the configuration of the particular optical transmission system 20.

The mean OSNR value for the channels may also be determined knowing the number of channels and the noise factor of the preamplifier 48. In other words, if the input power per channel into the preamplifier 48 (i.e. total input power/number of channels) is known, and the noise factor of the preamplifier 48 is known, the OSNR can be determined. This may be implemented for the upstream channels. In one embodiment, the input power per channel into, and the noise factor of, the booster amplifier 46 is known and the OSNR can be determined and implemented for the downstream channels.

In accordance with the present disclosure, messages and/or signals transmitted between nodes can be processed by circuitry within the input interface(s), and/or the output interface(s) and/or the control module. Circuitry could be analog and/or digital, components, or one or more suitably programmed microprocessors and associated hardware and software, or hardwired logic.

It should be understood that the headend node 34 and the tailend node 70 can be implemented in a variety of manners including those shown and discussed in U.S. Pat. No. 7,343,093, issued Mar. 11, 2008, entitled "Protected Bidirectional WDM Network", the entire contents of which are hereby incorporated herein by reference in its entirety.

CONCLUSION

Conventionally, optical power gain has been set without consideration of loss of power throughout the optical transmission system. In accordance with the present disclosure, gain can be determined and set for an optical transmission system 20, taking into account the losses of power of components of the optical transmission system 20, and setting the components to balance power when transmissions are moved between the first line 30 and the second line 32.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Further, while implementations have been described in the context of an optical network, this need not be the case. These implementations may apply to an electronic network using copper cabling, or even a wireless network.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. An optical transmission system, comprising:
  a first node comprising components including one or more variable optical attenuator, a booster amplifier, a preamplifier, one or more multiplexer-demultiplexer filter configured to transmit and receive optical signals with first transceivers, a first filter and a second filter, and a switch, the preamplifier includes a monitoring port;
  the booster amplifier being operable to receive first signals from the first filter and supply first amplified signals to the second filter, the variable optical attenuator being coupled between the second filter and the switch, such that the second filter is operable to supply the first signals to the variable optical attenuator and the variable optical attenuator is operable to supply attenuated first signals to the switch, and the variable optical attenuator is operable to receive second signals from the switch and supply attenuated second signals to the preamplifier via the second filter, such that the preamplifier amplifies the attenuated second signals and supplies second amplified signals to the first filter;
a second node comprising one or more multiplexer-demultiplexer filter configured to transmit and receive optical signals with second transceivers; and
a first bidirectional optical fiber between the first node and the second node configured to carry data traffic in optical signals in a first number of optical channels from the first node to the second node and a second number of optical channels from the second node to the first node;
wherein power gain of the preamplifier of the first node is determined and set based on one or more of a power loss measurement parameters of the first node and on the second number of optical channels, in order to obtain a target client power of the optical signals transmitted to the first transceivers, the one or more of the power loss measurement parameters being a mean power loss of per channel of at least one of the second number of optical channels,
wherein the first node is operable to:
receive power loss measurement parameters for the components,
measure incoming power to the first node;
determine, based on the first number of optical channels on the first bi-directional optical fiber from the first node to the second node, a maximum output power per channel of the booster amplifier;
determine, based on the received loss measurement parameters, a power gain for the booster amplifier in the first node; and
setting the booster amplifier, based on the determined gain for the booster amplifier, to a power level to achieve a client line gain that avoids one or more of saturating the second transceivers of the second node and providing a level of power sufficient for the optical signals to be received by the second transceivers of the second node without bit error.

2. The optical transmission system of claim 1, wherein the power gain of the preamplifier of the first node is determined and set further based on an input power to the first node from the one or more second transceivers, the second number of optical channels carried on the first bidirectional optical fiber from the second node, and one or more of the power loss measurement parameters for the first node, to achieve the target client power to the one or more first transceivers.

3. The optical transmission system of claim 1, wherein the power gain for the preamplifier in the first node is determined and set based on subtracting the power of the optical signals coming from the one or more second transceivers from the target client power, adding ten times the logarithmic function base ten of the second number of optical channels carried on the first bidirectional optical fiber from the second node, and adding one or more power loss measurement parameters for the first node.

4. The optical transmission system of claim 3, wherein the power loss measurement parameters for the first node comprise a power loss that occurs in the components of the first node from a first line port into the first node from the first bidirectional optical fiber up to an input into the preamplifier plus the loss that occurs in the components of the first node from a point of output from the preamplifier through the first node and out of a filter of the first node to the one or more first transceivers.

5. The optical transmission system of claim 3, wherein the power gain of the preamplifier of the first node is re-determined and adjusted in response to changes in the optical transmission system.

6. The optical transmission system of claim 3, further comprising a second bidirectional optical fiber between the first node and the second node configured to carry data traffic in optical signals between the first node and the second node; and
wherein the power loss measurement parameters for the first node comprises the loss that occurs in the components of the first node from a second line port into the first node from the second bidirectional optical fiber up to an input into the preamplifier plus the loss that occurs in the components of the first node from a point of output from the preamplifier through the first node and out of a filter of the first node to the one or more first transceivers.

7. The optical transmission system of claim 1, wherein the power loss measurement parameters are stored in the first node.

8. The optical transmission system of claim 1, wherein the power gain of the preamplifier of the first node is re-determined and adjusted in order to obtain a target client power of the optical signals transmitted to the one or more first transceivers from the first node, when one or more parameters or components of the optical transmission system changes.

9. The optical transmission system of claim 1, wherein a target power level to the first transceivers is in a range of approximately −10 dBm to approximately −20 dBm or in a range of approximately −3 dBm to approximately −17 dBm.

10. The optical transmission system of claim 1, wherein a maximum target power level to the second transceivers is approximately a few dBm above a saturation level of the second transceivers.

11. A method, comprising:
receiving power loss measurement parameters for components of an optical transmission system through which optical signals are transmitted between one or more transceivers of a first node in the optical transmission system and one or more transceivers of a second node over a first bidirectional optical fiber, the first node including a booster amplifier, a preamplifier, and a variable optical attenuator, the preamplifier includes a monitoring port;
measuring incoming power to the first node, the first node including a first filter and a second filter, and a switch, the booster amplifier being operable to receive first signals from the first filter and supply first amplified signals to the second filter, the variable optical attenuator being coupled between the second filter and the switch, such that the second filter is operable to supply the first signals to the variable optical attenuator and the variable optical attenuator is operable to supply attenuated first signals to the switch, and the variable optical attenuator is operable to receive second signals from the switch and supply attenuated second signals to the preamplifier via the second filter, such that the preamplifier amplifies the attenuated second signals and supplies second amplified signals to the first filter;
determining, based on a number of channels on the first bi-directional optical fiber from the first node to the second node, a maximum output power per channel of the booster amplifier;

determining, based on the received loss measurement parameters, a power gain for a booster amplifier in the first node; and setting the booster amplifier, based on the determined gain for the booster amplifier, to a power level to achieve a client line gain that avoids one or more of saturating the one or more transceivers of the second node and providing a level of power sufficient for an optical signal to be received by the one or more transceivers of the second node without bit error.

12. The method of claim 11, wherein the gain for the booster amplifier in the first node is determined by adding a mean loss of power per channel in channels from the first bidirectional optical fiber for transmitting the optical signals from the first node to the second node plus a loss of power from an output of the booster amplifier to the output of the first node plus a predetermined power value for a variable optical attenuator in the first node, wherein the mean loss of power per channel is determined by adding the power level from the one or more transceivers of the second node to ten times the logarithmic function base ten of the number of channels from the first node, and subtracting the amount of power from the first bidirectional optical fiber.

* * * * *